United States Patent
Jackson

(10) Patent No.: US 9,743,297 B1
(45) Date of Patent: Aug. 22, 2017

(54) METHODS, SYSTEMS, AND COMPUTER READABLE MEDIA FOR TESTING WIRELESS DEVICES IN WIRELESS ENVIRONMENTS

(71) Applicant: Ixia, Calabasas, CA (US)

(72) Inventor: Stephen Samuel Jackson, Chapel Hill, NC (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 15/167,971

(22) Filed: May 27, 2016

(51) Int. Cl.
*H04B 17/00* (2015.01)
*H04W 24/06* (2009.01)

(52) U.S. Cl.
CPC .................. *H04W 24/06* (2013.01)

(58) Field of Classification Search
None
See application file for complete search history.

(56) References Cited

U.S. PATENT DOCUMENTS

| | | | | |
|---|---|---|---|---|
| 7,835,704 B2* | 11/2010 | Joung | ............... | H04B 17/0085 375/224 |
| 7,873,339 B2* | 1/2011 | Qi | ............... | H04B 17/309 455/226.2 |
| 8,000,656 B1* | 8/2011 | Jiao | ............... | H04B 17/0085 455/423 |
| 8,489,032 B2* | 7/2013 | Gordiyenko | ............... | H04B 17/29 370/203 |
| 8,718,122 B2* | 5/2014 | Griesing | ............... | H01Q 3/267 375/224 |
| 8,811,192 B2* | 8/2014 | Luong | ............... | H04W 24/06 370/245 |
| 9,088,430 B2* | 7/2015 | Huq | ............... | H04L 12/2697 |
| 9,273,982 B2* | 3/2016 | Shanishchara | ............... | G01C 25/00 |
| 2004/0076138 A1* | 4/2004 | Serceki | ............... | H04L 1/243 370/349 |
| 2012/0225624 A1* | 9/2012 | Ky sti | ............... | H01Q 3/2605 455/67.11 |
| 2015/0017928 A1* | 1/2015 | Griesing | ............... | H04B 17/0085 455/67.14 |
| 2015/0257019 A1* | 9/2015 | Durai | ............... | H04L 1/24 370/252 |

* cited by examiner

*Primary Examiner* — Tuan A Tran
(74) *Attorney, Agent, or Firm* — Jenkins, Wilson, Taylor & Hunt, P.A.

(57) ABSTRACT

Methods, systems, and computer readable media for testing wireless devices is disclosed. In some examples, a system for testing wireless devices in wireless environments comprises a test server and a wireless device tester implemented on the test server. The test server includes at least one processor and memory storing, for each wireless device of different types of wireless devices, a wireless emulation waveform received from the wireless device during operation of the wireless device. The wireless device tester is configured for receiving emulation requests specifying wireless devices and wireless environments for testing. The wireless device tester is configured for transmitting, for each request, a responsive wireless emulation waveform to a wireless device emulator physically located in the specified wireless environment and determining a performance metric for the wireless device within the specified wireless environment.

20 Claims, 6 Drawing Sheets

METHODS, SYSTEMS, AND COMPUTER READABLE MEDIA FOR TESTING WIRELESS DEVICES IN WIRELESS ENVIRONMENTS

TECHNICAL FIELD

The subject matter described in this specification relates generally to testing wireless devices and more particularly to testing wireless devices by transmitting recorded emulation waveforms in wireless environments.

BACKGROUND

The worldwide movement towards bring-your-own-device (BYOD) provides obvious gains in productivity, employee flexibility, user satisfaction, and cost savings, but the wireless local area networks (WLANs) tasked with carrying the traffic are struggling to keep up. And while governance, compliance, security, and mobile device management have received plenty of attention, the ability of Wi-Fi networks to support BYOD has not. BYOD taxes Wi-Fi networks with high scale and unpredictable application requirements.

The increasing prevalence of wireless access points is useful in enabling the Internet of Things (IoT), where physical objects are uniquely identifiable and able to interoperate with the Internet using embedded computing systems. Devices in the IoT can collect and report useful data and perform other functions. Testing IoT devices using conventional testing technology may be challenging where, for example, the conventional testing technology relies on supplying or executing instructions for a general purpose processor or standardized network hardware that is not present on an IoT device.

Accordingly, there exists a need for methods, systems, and computer readable media for testing wireless devices in wireless environments and particularly for testing new IoT devices in wireless environments that are already struggling to support BYOD and other applications.

SUMMARY

Different types of wireless devices can be tested in various wireless environments by recording, from each type of wireless device, a wireless emulation waveform received from the wireless device during operation of the wireless device. A test server can store recorded emulation waveforms and test scripts for testing the wireless devices. Wireless device emulators can be physically located in the wireless environments. By sending a recorded emulation waveform for a wireless device to a wireless device emulator in a wireless environment, the operation of the wireless device can be verified in the wireless environment before the actual wireless device is placed into the wireless environment.

In some examples, a system for testing wireless devices in wireless environments comprises a test server and a wireless device tester implemented on the test server. The test server includes at least one processor and memory storing, for each wireless device of different types of wireless devices, a wireless emulation waveform received from the wireless device during operation of the wireless device. The wireless device tester is configured for receiving emulation requests specifying wireless devices and wireless environments for testing. The wireless device tester is configured for transmitting, for each request, a responsive wireless emulation waveform to a wireless device emulator physically located in the specified wireless environment and determining, for each request, a performance metric for the wireless device within the specified wireless environment based on the wireless device emulator transmitting the responsive wireless emulation waveform in the specified wireless environment.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

This specification describes systems, methods, and computer readable media for testing IoT devices and other types of wireless devices. The wireless devices can be tested and verified to operate according to design specifications in various wireless environments before the actual devices are brought into the wireless environments. Wireless devices can be tested even though the wireless device may lack a general purpose processor and even though the wireless device may produce a wireless signal that general purpose communication hardware cannot produce by virtue of signal processors that can record and reproduce various wireless waveforms.

Figure 1:
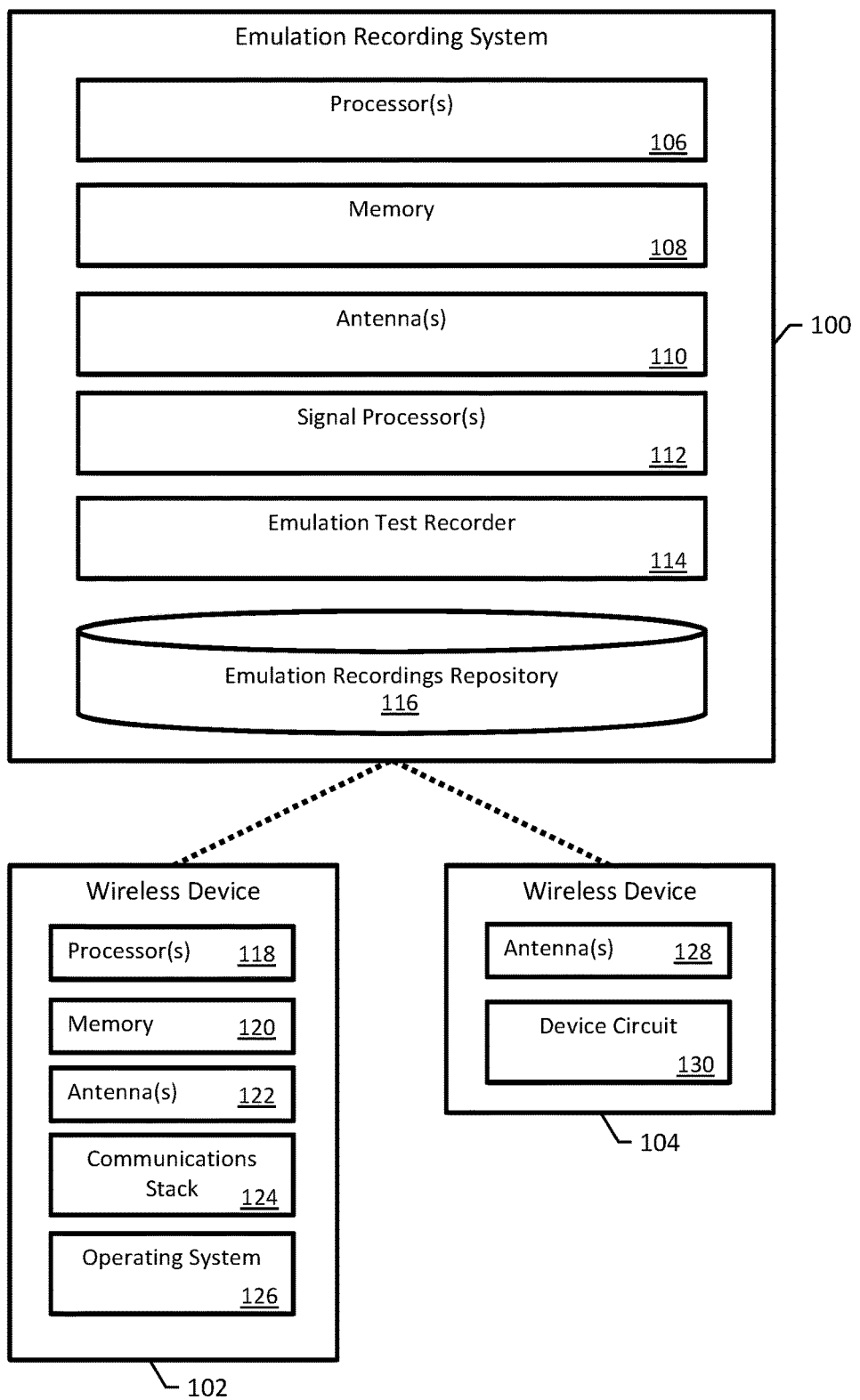
FIG. 1 is a block diagram of an example emulation recording system.

FIG. 1 is a block diagram of an example emulation recording system 100. Emulation recording system 100 is a computer system configured, by virtue of appropriate programming, to record wireless emulation waveforms from different types of wireless devices. FIG. 1 shows two example wireless devices 102 and 104 for purposes of illustration.

Emulation recording system 100 includes one or more processors 106 and memory 108 storing executable instructions for processors 106. Emulation recording system 100 also includes one or more antennas 110 and one or more signal processors 112 for generating wireless signals to transmit on antennas 110 and processing received signals from antennas 110. Signal processors 112 can be configured, by virtue of appropriate hardware selection and design, to process and generate both baseband and modulated signals and to process and generate both in-phase and quadrature components of waveforms.

Emulation recording system 100 includes an emulation test recorder 114 which can be implemented as software for recording and storing wireless emulation waveforms, e.g., as executable instructions that are loaded into random access memory (RAM) for execution by processors 106. Emulation test recorder 114 is configured for recording a wireless emulation waveform from each of wireless devices 102 and 104 and storing the wireless emulation waveforms in an emulation recordings repository 116.

Emulation recordings repository 116 can include a database associating wireless emulation waveforms with device identifiers for different types of wireless devices. In some examples, emulation test recorder 114 includes a graphical user interface to assist a system operator in recording wireless emulation waveforms by presenting screens to the system administrator on a display device and prompting the system administrator for user input regarding the wireless device being recorded.

In operation, emulation test recorder 114 and a system operator work together to cause wireless devices 102 and 104 to produce testable behaviors or testable interactions with emulation recording system 100. For example, the system operator may need to configure or activate wireless devices 102 and 104, and then emulation recording system may need to transmit a signal to wireless devices 102 and 104 to cause wireless devices 102 and 104 to start operation. During operation, emulation recording system 100 records wireless emulation waveforms.

For instance, consider an example scenario for characterizing wireless device 102. Wireless device 102 includes one or more processors 118, memory 120, one or more antennas 122, a communications stack 124 for communicating with a wireless access point, and an operating system 126. For example, wireless device may be a mobile phone with a touchscreen user interface. Communications stack 124 is configured to communicate according to a communications protocol. The communications protocol can be, e.g., an 802.11 protocol, an 802.22 protocol, a long term evolution (LTE) protocol, an amplitude modulation (AM) or frequency modulation (FM) protocol, a phase modulation protocol, or a combination of protocols.

To test a behavior of wireless device 102, the system operator and emulation recording system 100 configure wireless device 102 to produce the behavior. For example, the system operator may install an application on wireless device 102, begin recording the wireless emulation waveform using emulation test recorder 114, and then launch the application on wireless device 102. Then, emulation test recorder 114 records a wireless emulation waveform produced by wireless device 102. In the event that the application needs to interact with another device to fully characterize the behavior, emulation test recorder 114 can emulate the other device and record a series of wireless waveforms exchanged between wireless device 102 and emulation recording system 100.

In another instance, consider an example scenario for characterizing wireless device 104. Wireless device 104 includes one or more antennas 128 and a device circuit 130. Wireless device 104 lacks a communications stack and an operating system, perhaps to reduce the size, weight, and cost of wireless device 104. For example, wireless device 104 may be an IoT device having one or more sensors and only the ability to report readings from the sensors. Device circuit 130 may produce wireless signals that are not produced by communications stack 124 of wireless device 102.

In this case, testing wireless device 104 may not be possible with some conventional testing devices, since a device like wireless device 102 may not be configured to reproduce the behaviors of wireless device 104. To test a behavior of wireless device 104, the system operator and emulation recording system 100 configure wireless device 104 to produce the behavior. For example, the system operator may need to toggle a switch on wireless device 104 and energize wireless device 104 with a radio frequency (RF) signal, e.g., using a radio frequency identification (RFID) interrogator.

Emulation test recorder 114 can be configured to produce any wireless signals needed to cause wireless device 104 to produce the behavior. Then, emulation test recorder 114 records a wireless emulation waveform produced by wireless device 104. Emulation test recorder 114 can record a series of wireless waveforms exchanged between wireless device 104 and emulation recording system 100, if appropriate for the behavior of wireless device 104.

Figure 2A:
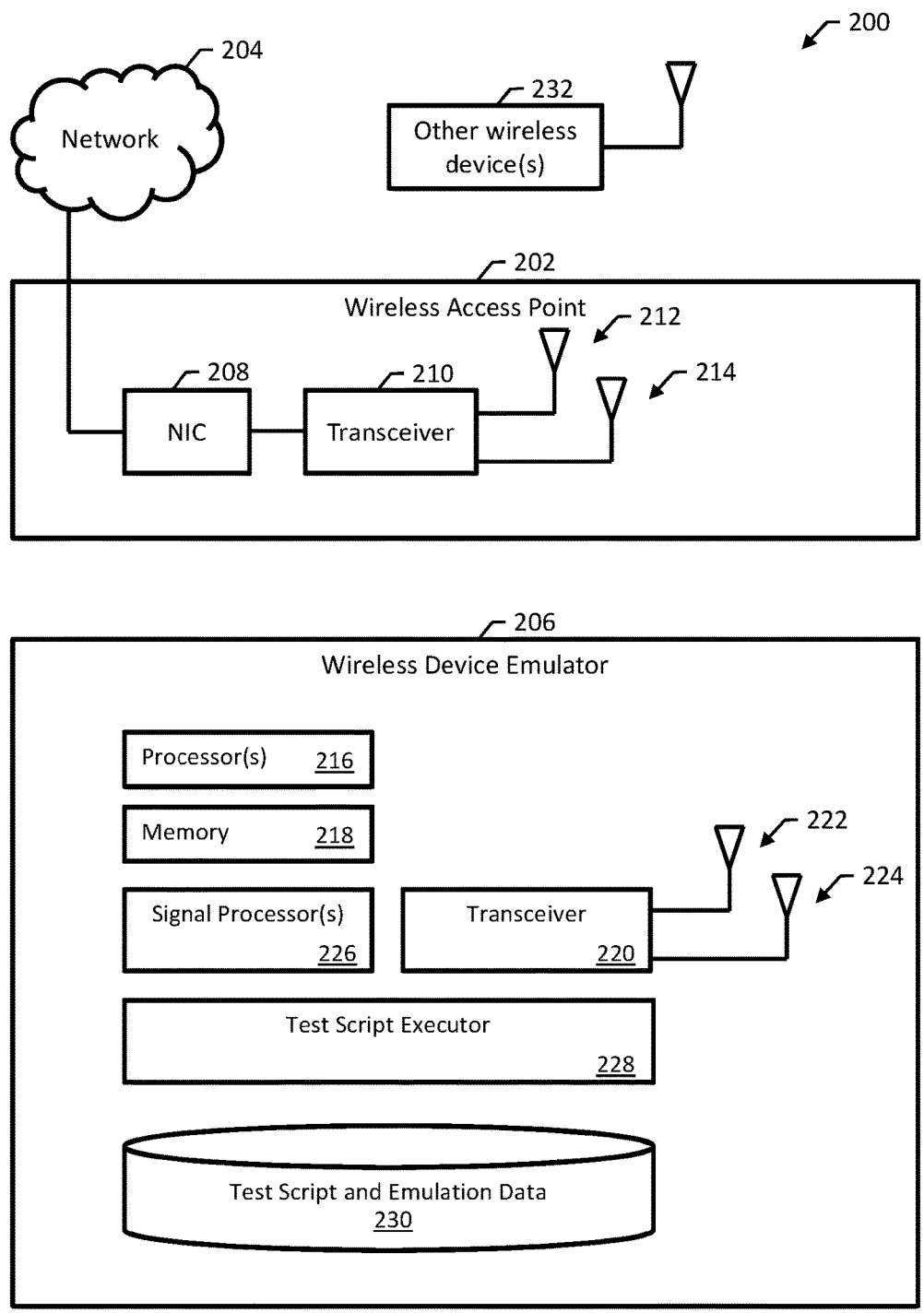
FIG. 2A is a block diagram of an example wireless environment.

FIG. 2A is a block diagram of an example wireless environment 200. A wireless environment is a physical space where wireless service is provided. Wireless environment 200 includes a wireless access point 202 for providing access to a data communications network 204, which can be, e.g., the Internet. Wireless environment 200 also includes a wireless device emulator 206 and optionally one or more other wireless devices 232. Wireless environment 200 can be implemented using one or more access points configured so that wireless devices can connect to the Internet regardless of which particular access point is closest.

In general, wireless access point 202 is an electronic device that is configured to enable wireless devices to connect to network 204. For example, wireless access point 202 can use Wi-Fi or other related standards, and wireless access point 202 can connect to or be integrated with a router. Wireless access point 202 includes a network interface card 208 for connection to network 204, e.g., by an Ethernet connection.

Wireless access point 202 also includes a transceiver 210 and one or more antennas 212 and 214 for radio frequency communication. In some examples, wireless access point 202 is configured to use a communications protocol defined in Institute of Electrical and Electronics Engineers (IEEE) standards, e.g., IEEE 802.11 standards. In wireless environment 200, wireless access point 202 provides wireless service to wireless device emulator 206 and the optional other wireless devices 232.

Wireless device emulator 206 is an electronic device configured for receiving a wireless emulation waveform using wireless access point 202 and transmitting the wireless emulation waveform into wireless environment 200. Wireless device emulator 206 is configured to report a test result based on transmitting the wireless emulation waveform. Receiving the wireless emulation waveform and reporting the test result are described further below with reference to FIG. 3. Since wireless device emulator 206 is physically located within wireless environment 200, wireless device emulator 206 can verify operational characteristics of a type of wireless device in wireless environment 200 before an actual wireless device of that type of wireless device is physically brought into wireless environment 200.

Wireless device emulator 206 includes one or more processors 216 and memory 218 storing executable instructions for processors 216. Wireless device emulator also includes a transceiver 220, one or more antennas 222 and 224, and one or more signal processors 226. Signal processors 226 can be configured, by virtue of appropriate hardware selection and design, to process and generate both baseband and modulated signals and to process and generate both in-phase and quadrature components of waveforms.

Wireless device emulator 206 includes a test script executor 228 and a repository 230 of test scripts and emulation data that stores wireless emulation waveforms. Test script executor 228 is implemented using processors 216. In operation, test script executor 228 receives and stores wireless emulation waveforms and test scripts. Test script executor 228 executes the test scripts and transmits, using signal processors 226, wireless emulation waveforms to emulate a type of wireless device in wireless environment 200.

For example, test script executor 228 can be configured to receive a test script and one or more wireless emulation waveforms, execute the script and transmit the waveforms, and then report a test result. Executing the test script can include transmitting a first waveform; waiting to receive a second waveform, e.g., from wireless access point 202 or one of wireless devices 232; and then transmitting a third waveform.

In some examples, test script executor 228 transmits test packets to wireless access point 202. Test script executor 228 then receives responsive packets from wireless access point 202. Test script executor 228 determines the test result based on receiving the responsive packets. For instance, test script executor 228 can determine whether a data transfer rate is obtainable using wireless access point 202, or test script executor 228 can determine whether a network-based service is accessible using wireless access point 202. Receiving the wireless emulation waveform can include receiving in-phase and quadrature components of the wireless emulation waveform, and test script executor 228 can cause signal processors 226 to transmit a modulated waveform using transceiver 220 and antennas 222 and 224 based on the in-phase and quadrature components of the wireless emulation waveform.

Figure 2B:
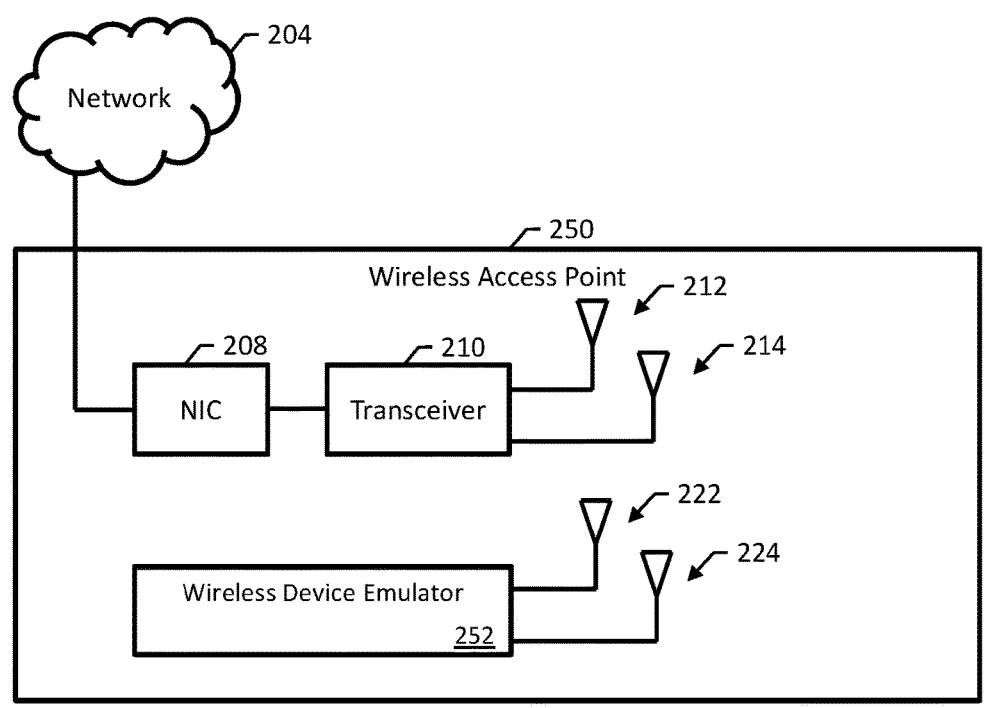
FIG. 2B is block diagram of an example wireless access point including an integrated wireless device emulator.

FIG. 2B is block diagram of an example wireless access point 250 including an integrated wireless device emulator 252. Wireless device emulator 252 is integrated into wireless access point 250 by virtue of, e.g., sharing a common physical housing or power supply or both. Wireless device emulator 252 includes one or more antennas 222 and 224 which are separate from one or more antennas 212 and 214 that wireless access point 250 uses for providing wireless service.

Integrating wireless device emulator 252 into wireless access point 250 can be useful for, e.g., reducing the cost and complexity of wireless device emulator 252 since wireless device emulator 252 may use components of wireless access point 250 such as a power supply. Integrating wireless device emulator 252 into wireless access point 250 may also be useful for, e.g., distributing wireless device emulators into various wireless environments without having to separately distribute wireless access points and wireless device emulators.

Figure 3:
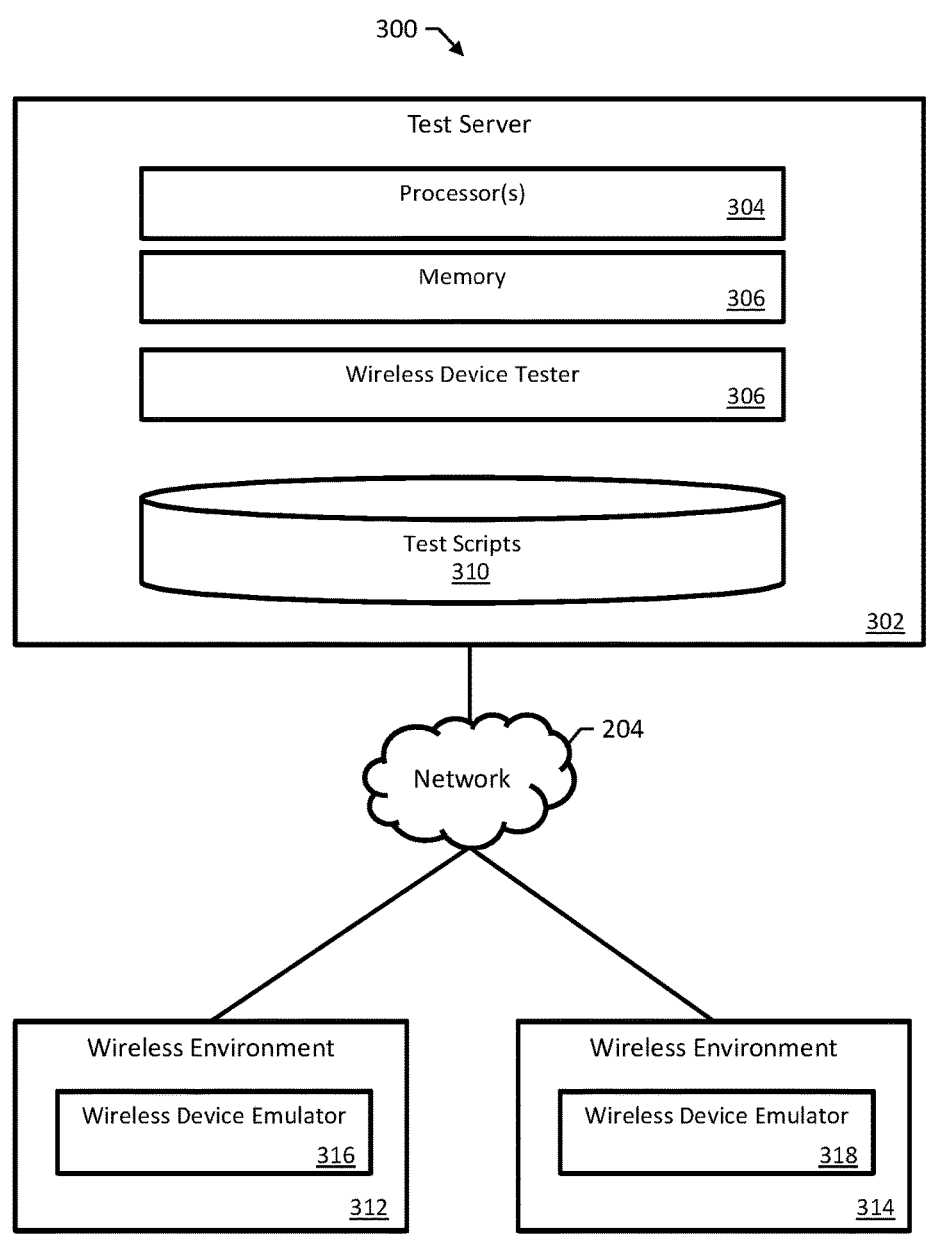
FIG. 3 is a block diagram of an example system for testing wireless devices.

FIG. 3 is a block diagram of an example system 300 for testing wireless devices. System 300 includes a test server 302 in communication with devices in two example wireless environments 312 and 314 over a data communications network 204. Wireless environments 312 and 314 each include at least one wireless device emulator 316 and 318. Wireless device emulators 316 and 318 can be, e.g., the wireless device emulator 206 of FIG. 2A or the wireless device emulator 252 of FIG. 2B.

Test server 302 includes one or more processors 304 and memory 306 storing executable instructions for processors 304. Test server 302 also includes a wireless device tester 306 implemented using processors 304 and a repository 310 of test scripts and wireless emulation waveforms. In operation, wireless device tester 306 receives emulation requests specifying types of wireless devices to be tested in wireless environments, transmits responsive test scripts and wireless emulation waveforms to wireless device emulators physically located in the wireless environments, and determines performance metrics for the wireless devices. Wireless device tester 306 can include a graphical user interface to facilitate receiving requests and providing performance metrics, e.g., test server 302 may host a website that system administrators can use to submit request and receive performance metrics.

For example, suppose that a system administrator is testing the operation of the wireless device 104 of FIG. 1 in wireless environment 312. The system administrator uses a personal computer, tablet, or smart phone to access the website hosted by test server 302. The system administrator specifies any appropriate information to test server 302, e.g., the type of wireless device to be tested and a network address for wireless device emulator 316, by entering the information using the website. For example, the website may provide a list of available types of wireless devices for the system administrator.

Wireless device tester 306 then transmits a test script and one or more waveforms to wireless device emulator 316. If the test script requires wireless device emulator 316 to interact with a service on network 104, wireless device emulator 316 may interact with the actual service or wireless device tester 306 may be configured to emulate the service, e.g., by executing a server-side test script. Wireless device emulator executes the test script, transmits one or more wireless emulation waveforms, and reports a test result to wireless device tester 306. Wireless device tester 306 determines a performance metric for the wireless device based on the test result, and test server 302 presents the performance metric to the system administrator using the website hosted by test server 302.

For example, suppose that wireless device emulator 316 transmits test packets and receives responsive test packets in executing the test script. In some examples, wireless device emulator 316 simply reports the responsive test packets to wireless device tester 306, and wireless device tester 306 determines whether the expected packets were received or whether a specified data transfer rate was obtained during the test. In some other examples, wireless device emulator 316 determines a data transfer rate and reports the rate to wireless device tester 306, and wireless device tester 306 determines whether the determine rate meets a specified rate for the type of wireless device. In general, determining the outcome of the test can be shared between wireless device tester 306 and wireless device emulator 316, so that either device may perform some or all of the processing requested to test the wireless device.

Test server 302 can therefore test various different types of wireless devices in diverse wireless environments before actual wireless devices are brought in those wireless environments. Some wireless devices could be tested even before the wireless devices are purchased for deployment in a wireless environment, and some wireless devices can be verified to operate according to design specifications in a wireless environment before attempting to operate an actual wireless device in the wireless environment.

Figure 4:
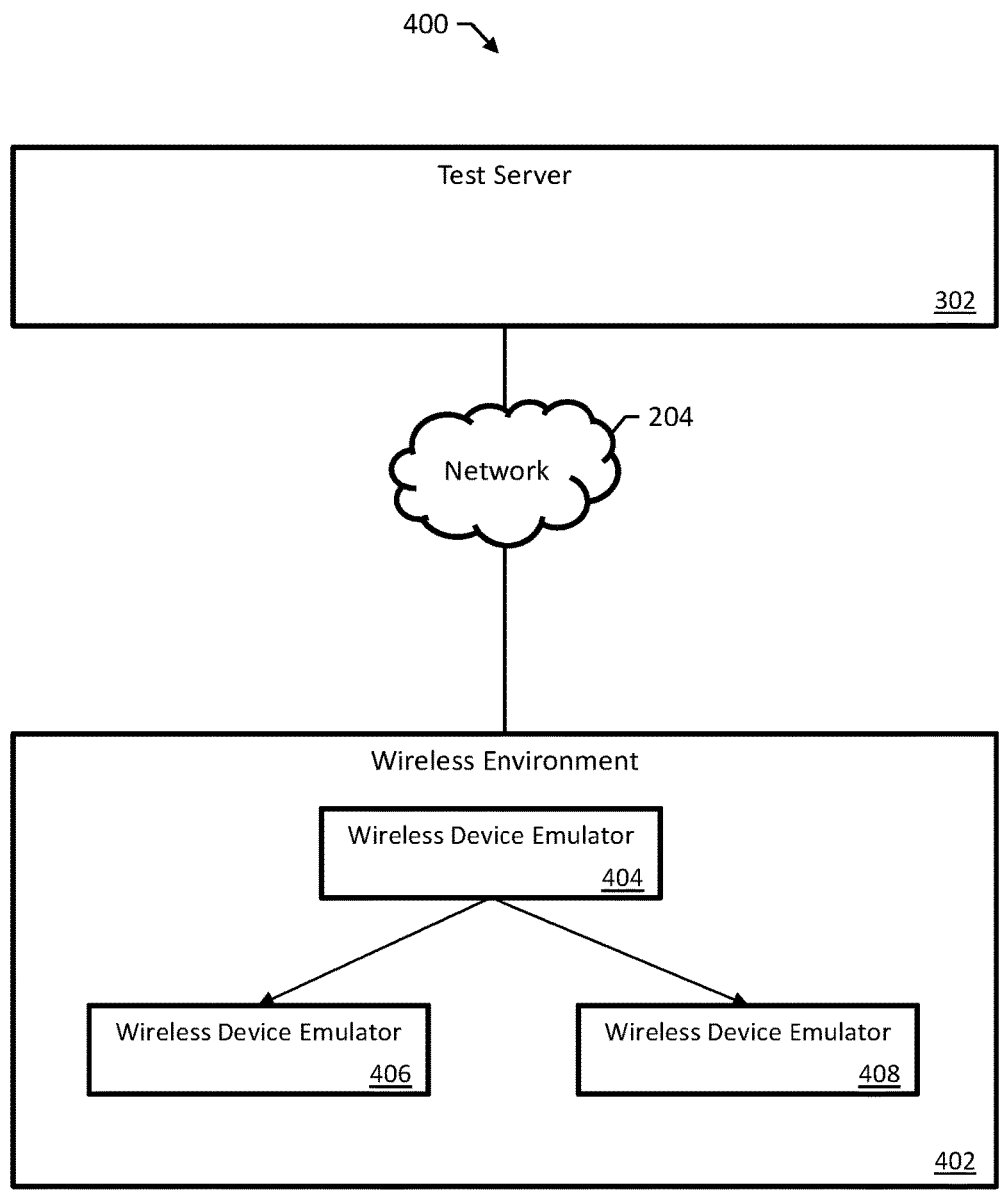
FIG. 4 is a block diagram illustrating hierarchical deployment of test scripts and wireless emulation waveforms within an example system.

FIG. 4 is a block diagram illustrating hierarchical deployment of test scripts and wireless emulation waveforms within an example system 400. In example system 400, test server 302 is testing one or more wireless devices in an example wireless environment 402. Test server 302 sends test scripts and wireless emulation waveforms to a first wireless device emulator 404, and the first wireless device emulator 404 distributes the test scripts and wireless emulation waveforms to other wireless device emulators 406 and 408. In this manner, test scripts and wireless emulation waveforms can be efficiently distributed to wireless device emulators within a wireless environment.

In some examples, wireless device emulator 404 distributes different test scripts and wireless emulation waveforms to wireless device emulators 406 and 408. For example, wireless device emulator 404 may be emulating a certain type of wireless device, and wireless device emulators 406 and 408 may be emulating a different type of wireless device. Wireless emulators 406 and 408 may be emulating a type of wireless device that lacks functionality of the type of wireless device emulated by wireless emulator 404. Using the hierarchical deployment illustrated in FIG. 4, test scripts and wireless emulation waveforms can be efficiently distributed to wireless device emulators 404, 406, and 408.

Figure 5:
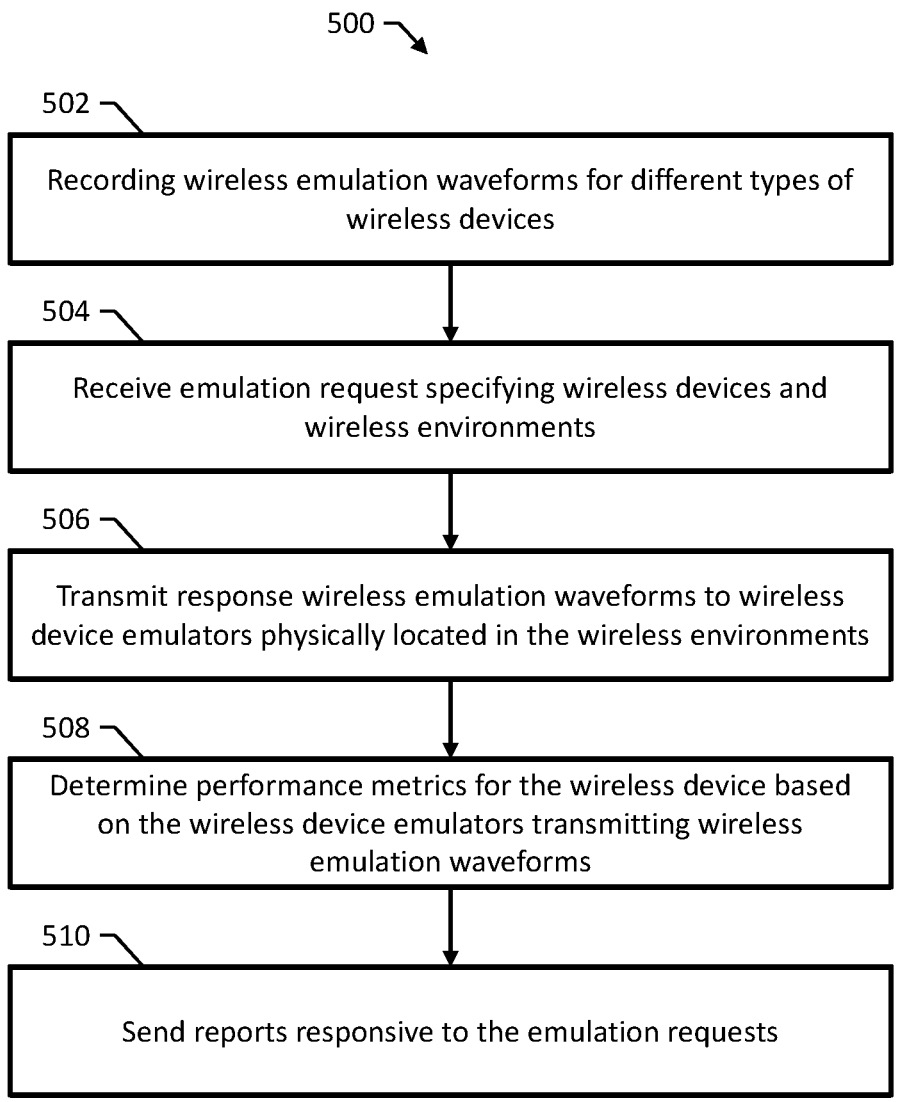
FIG. 5 is a flow diagram of a method for testing wireless devices in wireless environments.

FIG. 5 is a flow diagram of an example method 500 for testing different types of wireless devices in wireless environments. Method 500 is performed by a system of one or more computers. For example, method 500 can be performed by the test server 300 of FIG. 3. In some examples, method 500 is performed by test server 300 in cooperation with the emulation recording system 100 of FIG. 1 and the wireless device emulator 206 of FIGS. 2A and 2B.

The system records, from each wireless device of a number of different types of wireless devices, a wireless emulation waveform received from the wireless device during operation of the wireless device (502). Recording a wireless emulation waveform can include recording a series of wireless waveforms exchanged between the wireless device and a wireless transmitter interacting with the wireless device. The system can associate the recorded wireless emulation waveforms with wireless device identifiers in a database, e.g., as described above with reference to FIG. 1.

The system receives emulation requests (504). Each emulation request specifies a wireless device for emulation in a wireless environment. For example, the system can receive emulation requests over a data communications network from system administrators of the wireless environments, e.g., as described above with reference to FIG. 3.

The system transmits, for each request, a responsive wireless emulation waveform to a wireless device emulator physically located in the specified wireless environment (506). Transmitting a responsive wireless emulation waveform can include transmitting the series of wireless waveforms to the wireless device emulator. The wireless device emulator receives the wireless emulation waveforms and in response transmits the series of wireless waveforms in the wireless environment, e.g., as described above with reference to FIGS. 2A-2B and FIG. 3. In some examples, the wireless device emulator transmits test packets to a wireless access point for the wireless environment and receive responsive test packets from the wireless access point.

The system determines, for each request, a performance metric for the wireless device within the specified wireless environment based on the wireless device emulator transmitting the responsive wireless emulation waveform in the specified wireless environment (508). For example, the system can determine the performance metric based on test packets exchanged with a wireless access point, e.g., as described above with reference to FIGS. 2A-2B and FIG. 3. In some examples, determining the performance metric includes determining whether a network-based service associated with the wireless device is accessible in the specified wireless environment. In some examples, determining the performance metric includes determining whether a data transfer rate associated with the wireless device is obtainable in the specified wireless environment.

The system sends reports responsive to the emulation requests (510). For example, the system can send a message to the system administrator who sent the emulation request. The report can indicate, for example, that the specified wireless device has been verified to operate as designed in the specified wireless environment. The report can include any appropriate content regarding the testing with the wireless device emulator.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for testing wireless devices in a plurality of wireless environments, the method comprising:
   recording, from each wireless device of a plurality of different types of wireless devices, a wireless emulation waveform received from the wireless device during operation of the wireless device;
   receiving a plurality of emulation requests, each emulation request specifying a specified wireless device for emulation in a specified wireless environment;
   transmitting, for each request, a responsive wireless emulation waveform to a wireless device emulator physically located in the specified wireless environment; and
   determining, for each request, a performance metric for the wireless device within the specified wireless environment based on the wireless device emulator transmitting the responsive wireless emulation waveform in the specified wireless environment.

2. The method of claim 1, wherein recording, from each wireless device, a wireless emulation waveform comprises recording a series of wireless waveforms exchanged between the wireless device and a wireless transmitter interacting with the wireless device.

3. The method of claim 2, wherein transmitting, for each request, a responsive wireless emulation waveform comprises transmitting the series of wireless waveforms to the wireless device emulator, causing the wireless device emulator to transmit the series of wireless waveforms.

4. The method of claim 1, wherein determining, for each request, the performance metric comprises transmitting a plurality of transmit test packets from the wireless device emulator to a wireless access point for the specified wireless environment, receiving a plurality of receive test packets from the wireless access point, and determining the performance metric based on the transmit test packets and the receive test packets.

5. The method of claim 4, wherein determining, for each request, the performance metric comprises determining whether a network-based service associated with the wireless device is accessible in the specified wireless environment.

6. The method of claim 4, wherein determining, for each request, the performance metric comprises determining whether a data transfer rate associated with the wireless device is obtainable in the specified wireless environment.

7. The method of claim 1, wherein at least one of the wireless devices lacks a general purpose processor, and wherein recording, from each wireless device, a wireless emulation waveform comprises recording in-phase and quadrature components of the wireless emulation waveform.

8. A system for testing wireless devices in a plurality of wireless environments, the system comprising:
   a test server comprising at least one processor and memory storing, for each wireless device of a plurality of different types of wireless devices, a wireless emulation waveform received from the wireless device during operation of the wireless device;
   a wireless device tester implemented on the test server and configured for:
      receiving a plurality of emulation requests, each emulation request specifying a specified wireless device for emulation in a specified wireless environment;
      transmitting, for each request, a responsive wireless emulation waveform to a wireless device emulator physically located in the specified wireless environment; and
      determining, for each request, a performance metric for the wireless device within the specified wireless environment based on the wireless device emulator transmitting the responsive wireless emulation waveform in the specified wireless environment.

9. The system of claim 8, wherein the memory stores, for each wireless device, a series of wireless waveforms exchanged between the wireless device and a wireless transmitter interacting with the wireless device.

10. The system of claim 9, wherein transmitting, for each request, a responsive wireless emulation waveform comprises transmitting the series of wireless waveforms to the wireless device emulator, causing the wireless device emulator to transmit the series of wireless waveforms.

11. The system of claim 8, wherein determining, for each request, the performance metric comprises transmitting a plurality of transmit test packets from the wireless device emulator to a network access transceiver for the specified wireless environment, receiving a plurality of receive test packets from the network access transceiver, and determining the performance metric based on the transmit test packets and the receive test packets.

12. The system of claim 11, wherein determining, for each request, the performance metric comprises determining whether a network-based service associated with the wireless device is accessible in the specified wireless environment.

13. The system of claim 11, wherein determining, for each request, the performance metric comprises determining whether a data transfer rate associated with the wireless device is obtainable in the specified wireless environment.

14. The system of claim 8, comprising the wireless device emulators physically located in the specified wireless environments, and wherein at least one of the wireless devices lacks a general purpose processor, and wherein the memory stores, for each wireless device, in-phase and quadrature components of the wireless emulation waveform.

15. A wireless access point comprising:
   a network interface for communicating with a data communications network;
   a transceiver for providing wireless access from a plurality of other devices to the data communications network using the network interface; and
   a wireless device emulator configured for:
      receiving a wireless emulation waveform from a test server over the data communications network using the transceiver;
      transmitting the wireless emulation waveform; and
      reporting a test result based on transmitting the wireless emulation waveform to the test server over the data communications network using the transceiver.

16. The wireless access point of claim 15, comprising at least one first antenna for the transceiver and at least one second antenna for the wireless device emulator.

17. The wireless access point of claim 15, wherein the wireless device emulator is configured for transmitting a plurality of transmit test packets to the transceiver, receiving a plurality of receive test packets from the transceiver, and determining the test result based on the transmit test packets and the receive test packets.

18. The wireless access point of claim 15, wherein the wireless device emulator is configured for determining the test result by determining whether a network-based service is accessible using the transceiver.

19. The wireless access point of claim 15, wherein the wireless device emulator is configured for determining the test result by determining whether a data transfer rate is obtainable using the transceiver.

20. The wireless access point of claim 15, wherein receiving the wireless emulation waveform comprises receiving in-phase and quadrature components of the wireless emulation waveform, and wherein the wireless device emulator comprises one or more signal processing chips for transmitting a modulated waveform based on the in-phase and quadrature components of the wireless emulation waveform.

* * * * *